United States Patent
Suzuki

(10) Patent No.: US 8,103,819 B2
(45) Date of Patent: Jan. 24, 2012

(54) INFORMATION STORAGE DEVICE AND STORED DATA PROCESSING METHOD

(75) Inventor: Toshio Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 685 days.

(21) Appl. No.: 12/023,675

(22) Filed: Jan. 31, 2008

(65) Prior Publication Data

US 2008/0215833 A1    Sep. 4, 2008

(30) Foreign Application Priority Data

Feb. 19, 2007  (JP) .................................. 2007-038661

(51) Int. Cl.
*G06F 12/00* (2006.01)
(52) U.S. Cl. ................. 711/103; 711/159; 711/E12.069
(58) Field of Classification Search ........................ None
See application file for complete search history.

(56) References Cited

U.S. PATENT DOCUMENTS 7,178,061 B2 * 2/2007 Aasheim et al. ............... 714/24
2004/0078666 A1 * 4/2004 Aasheim et al. ............... 714/24

FOREIGN PATENT DOCUMENTS

| JP | 11-144478 | 5/1999 |
| JP | 11-328982 | 11/1999 |
| JP | 11328982 A * | 11/1999 |

OTHER PUBLICATIONS

Japanese Official Action Mailed Jan. 6, 2009, issued in Counterpart Application No. 2007-038661 (5 pages).

* cited by examiner

*Primary Examiner* — Pierre-Michel Bataille
*Assistant Examiner* — John P Fishburn
(74) *Attorney, Agent, or Firm* — Finnegan, Henderson, Farabow, Garrett & Dunner, L.L.P.

(57) ABSTRACT

An information storage device includes one or more semiconductor memories storing management data accompanying content data and being configured to erase data in units of one block, and a controller setting up, in the one or more semiconductor memories, a working area to temporarily store the management data and a storage area to retain all or part of the management data stored in the working area, writing the management data to the working area while monitoring the free space of the working area, moving the management data stored in the working area to the storage area when the free space of the working area falls below a prescribed value, and erasing the management data stored in the working area after the movement of the management data to the storage area.

8 Claims, 3 Drawing Sheets

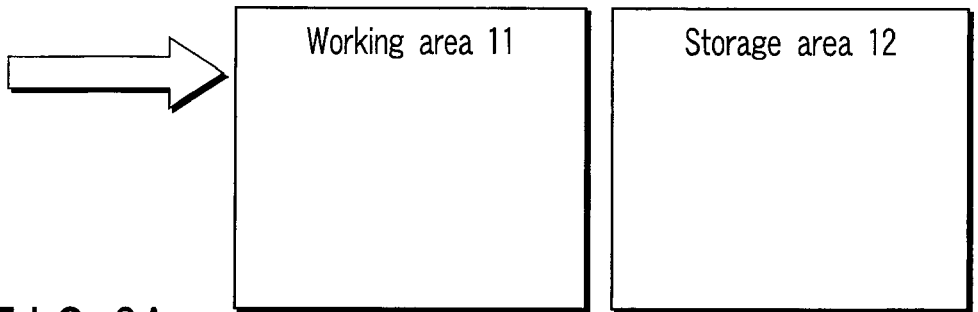
F I G. 3A
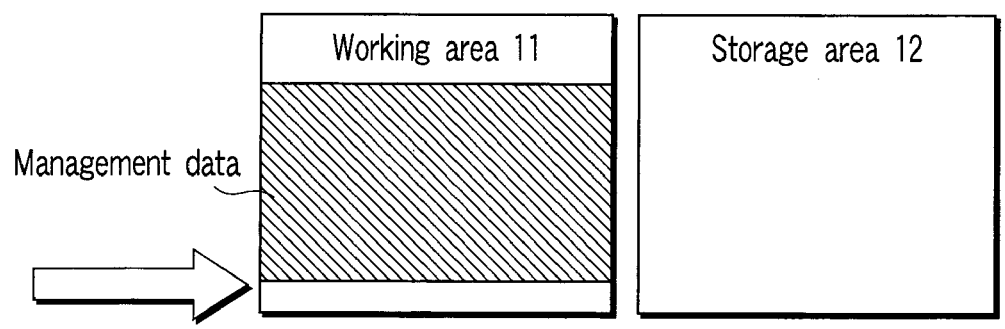
F I G. 3B
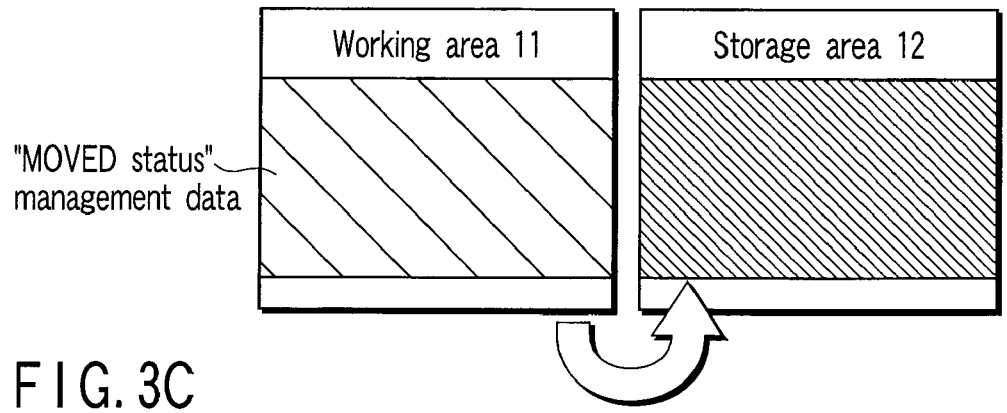
F I G. 3C

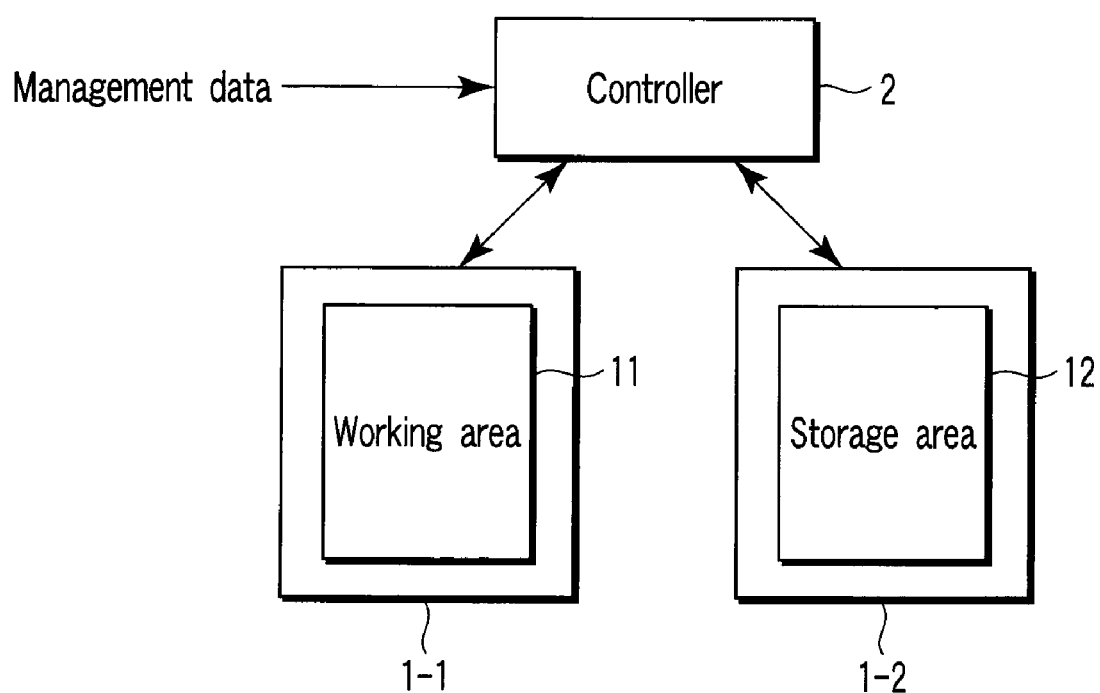
F I G. 4

INFORMATION STORAGE DEVICE AND STORED DATA PROCESSING METHOD

CROSS-REFERENCE TO RELATED APPLICATIONS

This application is based upon and claims the benefit of priority from prior Japanese Patent Application No. 2007-038661, filed Feb. 19, 2007, the entire contents of which are incorporated herein by reference.

BACKGROUND OF THE INVENTION

1. Field of the Invention

The present invention relates to an information storage device which stores management data, such as that for content data, in a semiconductor memory and a stored data processing method which manages stored data preserved in the semiconductor memory.

2. Description of the Related Art

An information storage device which uses a semiconductor memory as a recording medium is coming into wide use in recording and reproduction of information, such as content data, because it allows multi-channel simultaneous multi-access and high-speed random access. In particular, the information storage device contains no moving parts and therefore has the advantage of being high in reliability.

However, the number of times the information storage device may write data to the semiconductor memory is small as compared with a hard disk drive (HDD). Therefore, repeating the writing of content data to and deleting of it from the semiconductor memory over a long period may cause a memory failure. Such a failure is the main obstacle to data being reliably stored in the semiconductor memory.

In particular, with a conventional semiconductor memory storage device using a NOR flash memory, at the time of writing of moving images, management data produced with each frame of the moving images are stored in a specific area of the memory. Repeating the writing and erasing of moving images involves a large number of operations of writing management data to and deleting it from the specific area of the memory, which may result in the occurrence of a memory failure and cause or threaten loss of information in the memory.

There is a technique which permits the number of times information can be stored in a semiconductor memory to be virtually increased by providing the semiconductor memory with a plurality of storage areas, counting the number of times information is stored in the memory, and changing the storage areas in sequence according to the information storage count (see, for example, JP-A No. 11-144478 [KOKAI]).

BRIEF SUMMARY OF THE INVENTION

It is therefore an object of the invention to provide an information storage device and a stored data processing method which extends the life span of a semiconductor memory practically.

According to an aspect of the invention, there is provided an information storage device comprising: one or more semiconductor memories which store management data accompanying content data and are configured to erase data in units of one block; and a controller which sets up, in the one or more semiconductor memories, a working area to temporarily store the management data and a storage area to retain all or part of the management data stored in the working area, writes the management data to the working area while monitoring the free space of the working area, moves the management data stored in the working area to the storage area when the free space of the working area falls below a prescribed value, and erases the management data stored in the working area after the movement of the management data to the storage area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a conceptual diagram illustrating the start of writing management data to the storage unit in the first embodiment;

FIG. 3B is a conceptual diagram illustrating reaching a threshold of free space of the working area in the first embodiment;

FIG. 3C is a conceptual diagram illustrating movement of management data from the working area to the storage area in the first embodiment; and FIG. 4 is a schematic block diagram of an information storage device according to a second embodiment of the present invention.

DETAILED DESCRIPTION OF THE INVENTION

The embodiments of the present invention will be described in detail hereinafter with reference to the accompanying drawings.

First Embodiment

Figure 1:
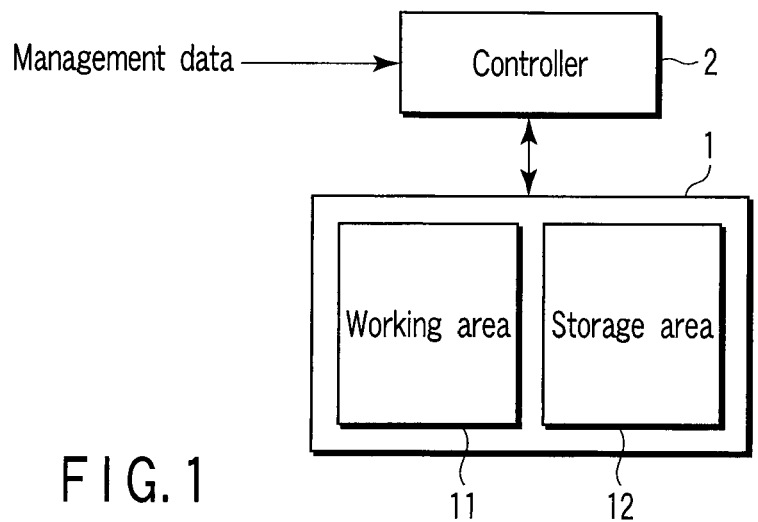
FIG. 1 is a schematic block diagram of an information storage device according to a first embodiment of the present invention.

FIG. 1 is a schematic block diagram of an information storage device according to a first embodiment of the present invention. The embodiments will be described herein by way of an example of assuming the content data to be video data and storing management data that is produced in each frame of the video data. The storage of video data itself is not directly related to the invention and therefore the description thereof is omitted here.

In FIG. 1, a storage unit 1 comprises a NOR flash memory in which data is erasable for each block. The NOR flash memory, which is small in capacity and costly in comparison with a NAND flash memory, suffers from no bit corruption and is therefore suitable for storage of management data.

A controller 2 sets up a working area 11 and a storage area 12 in the storage unit 1 and carries out operations of writing, reading and erasing of input management data with respect to the working area 11 and the storage area 12.

Management data is stored in the working area 11 in sequence in locations beginning with the starting address and, when the free space of the working area 11 falls below a prescribed threshold, a MOVE signal is output to the controller 2. The storage area 12 retains management data moved from the working area 11 under instruction by the controller 2.

The controller 2 writes externally input management data to the working area 11. Upon receipt of the MOVE signal from the working area 11, the controller 2 writes management data to the storage area 12. Then the controller 2 assigns "MOVED status" to this management data stored in the working area 11. In deleting management data stored in the working area 11, the controller 2 assigns "DELETED status" to them. The management data which have been assigned the "DELETED status" will not be assigned the "MOVED status". In addition, when a block of the working area 11 which is an erasable unit is filled with management data assigned the "MOVED status" and the "DELTED status", the management data stored in that block are erased.

The operation of the above-stated configuration will be described next.

Figure 2:
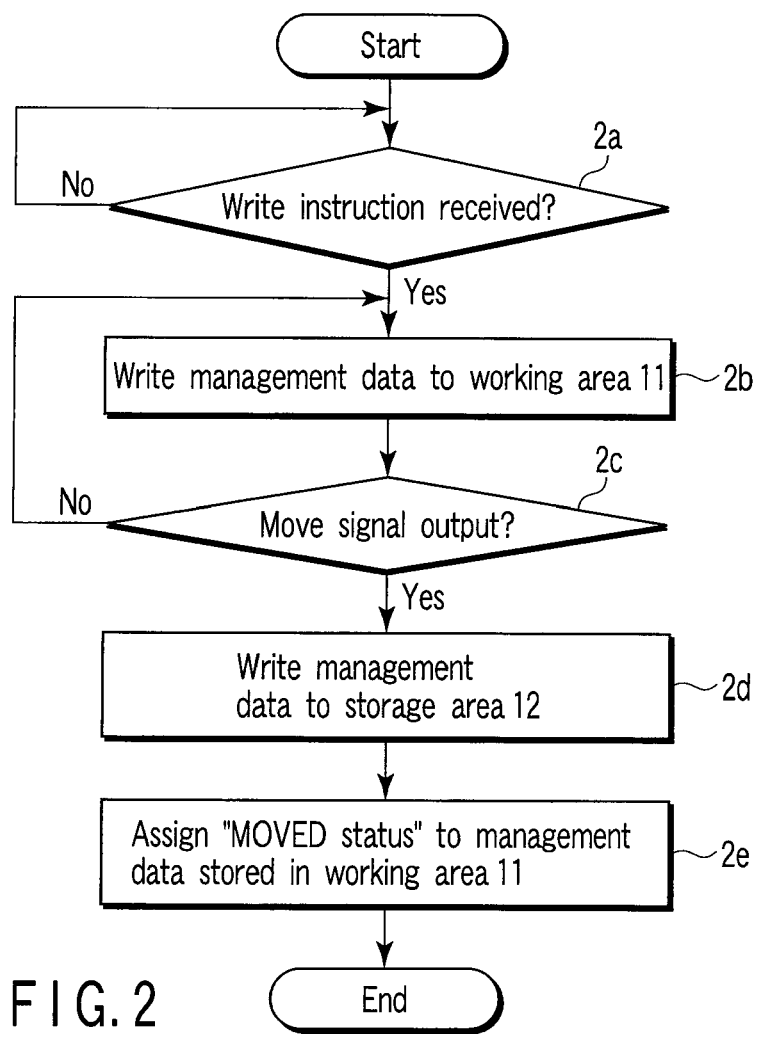
FIG. 2 is a flowchart for processing when the controller moves management data from the working area to the storage area in FIG. 1.

FIG. 2 is a flowchart for processing of the controller 2 to move management data from the working area 11 to the storage area 12 in the first embodiment of the invention shown in FIG. 1. FIGS. 3A, 3B and 3C are conceptual diagrams of storage of management data in the storage unit 1 according to the first embodiment of the invention. More specifically, FIG. 3A conceptually illustrates the start of writing management data to the storage unit 1, FIG. 3B illustrates reaching the threshold of the free space of the working area 11, and FIG. 3C illustrates the movement of management data from the working area 11 to the storage area 12.

First, when the controller 2 is instructed from outside to write management data to the storage unit 1 (Block 2a), the controller 2 writes management data to the working area 11 (Block 2b). Thereby, the working area 11 starts to store the management data in its locations beginning with the first address (FIG. 3A). The working area 11, when its free space falls below a threshold (FIG. 3B), outputs the MOVE signal to the controller 2 in order to move the management data to the storage area 12.

The controller 2 decides whether the MOVE signal is present or not (Block 2c). In the presence of the MOVE signal (YES in Block 2c), the controller 2 writes the management data to the storage area 12 (Block 2d). Subsequently, the controller 2 assigns the "MOVED status" to the management data which are stored in the working area 11 and have been written to the storage area 12 (Block 2e) (FIG. 3C). In the absence of the MOVE signal (NO in Block 2c), on the other hand, the procedure goes to Block 2b to continue the writing of management data to the working area 11.

As described above, the information storage device thus configured writes externally input management data in sequence to the working area 11 of the storage unit 1 as instructed by the controller 2. When the free space of the working area 11 falls below the threshold, the information storage device retains the management data in the storage area 12 and then assigns the "MOVED status" to this management data in the working area 11. In deleting management data in the working area 11, the information storage device assigns the "DELETED status" to the management data. When a block of the working area 11 is filled with management data which have been assigned the "MOVED status" and the "DELTED status", the information storage device erases that block. This makes it possible to prevent management data from being written to the same locations of the semiconductor memory.

Furthermore, even when a blank is produced between stored management data by repeating writing of management data to and deleting of it from the working area 11, the information storage device moves management data to the storage area 12 to thereby eliminate the blank as with disk optimization in HDD, allowing management data to be retained in order.

Accordingly, the information storage device of this embodiment can avoid writing of management data to the same locations in the semiconductor memory, which eases a restriction on the number of times management data can be written in the semiconductor memory virtually and allows the semiconductor memory to be used repeatedly over a long period. In addition, management data are retained in order in the storage area 12, allowing the semiconductor memory to be used in an efficient manner.

Second Embodiment

FIG. 4 is a schematic block diagram of an information storage device according to a second embodiment of the present invention. In FIG. 4, like reference numerals are used to denote the corresponding parts to those in FIG. 1 to thereby simplify the description.

In FIG. 4, storage units 1-1 and 1-2 each comprise a NOR flash memory which is capable of erasing data in block units. The controller 2 sets up the working area 11 in the storage unit 1-1 and the storage area 12 in the storage unit 1-2. Thus the controller 2 carries out operations of writing, reading and erasing of input management data with respect to the working area 11 and the storage area 12.

That is, the information storage device of this embodiment sets up the working area 11 in the storage unit 1-1 and the storage area 12 in the storage unit 1-2 and performs the same processing as in the first embodiment, thereby allowing management data to be prevented from being written to the same locations of the semiconductor memory.

Accordingly, the information storage device of this embodiment increases the number of times management data can be written to the semiconductor memory virtually and allows the semiconductor memory to be used repeatedly over a long period.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage device comprising:
nonvolatile semiconductor memory which stores management data items accompanying content data items and is configured to erase management data items in units of blocks; and
a controller which performs control for:
forming, in the nonvolatile semiconductor memory, a working area in which management data items may be temporarily stored and a storage area in which a copy of all or part of management data items stored in the working area may be stored;
storing management data items in the working area sequentially;

monitoring free space of the working area in which additional management data items may be stored, wherein when the free space falls below a predetermined value, management data items stored in the working area are copied to the storage area, and management data items in the working area, which are copied to the storage area, are assigned a first status indicating that storage processing to the storage area is completed; and only if a block in the working area is filled with management data items which are assigned the first status, erasing the management data items stored in that block.

2. The storage device according to claim 1, wherein the working area and the storage area are in the same nonvolatile semiconductor memory.

3. The storage device according to claim 1, wherein each of the working area and the storage area are in a separate nonvolatile semiconductor memory.

4. The storage device according to claim 1, wherein the controller further performs:

control for assigning unnecessary management data items stored in the working area a second status indicating that deletion is completed; and control for, if the block in the working area is filled with management data items which are assigned at least one of the first and second statuses, erasing the management data items stored in the block.

5. A stored data processing method for use with an information storage device which stores management data items accompanying content data items in nonvolatile semiconductor memory capable of erasing the management data items in units of blocks, the method comprising:

forming, in the nonvolatile semiconductor memory, a working area in which the management data items may be temporarily stored and a storage area in which all or part of the management data items stored in the working area may be stored;

sequentially storing management data items in the working area;

monitoring free space of the working area in which additional management data items may be stored, wherein when the free space falls below a predetermined value, any management data items stored in the working area are assigned a first status indicating that storage processing to the storage area is completed, and the management data items which are assigned the first status are copied to the storage area; and only if a block in the working area is filled with the management data items which are assigned the first status, erasing the management data items stored in the block.

6. The stored data processing method according to claim 5, wherein the working area and the storage area are formed in the same nonvolatile semiconductor memory.

7. The stored data processing method according to claim 5, wherein each of the working area and the storage area is formed in a separate nonvolatile semiconductor memory.

8. The stored data processing method according to claim 5, further comprising:

assigning unnecessary management data items stored in the working area a second status indicating that deletion is completed; and if the block in the working area is filled with the management data items which are assigned at least one of the first and second statuses, erasing the management data items stored in the block.

* * * * *